Aug. 5, 1969  L. R. SMITH  3,459,230
PIPE STOPPER
Filed Aug. 31, 1966

LESTER R. SMITH
INVENTOR.
BY Norman H. Duff

United States Patent Office 3,459,230
Patented Aug. 5, 1969

3,459,230
PIPE STOPPER
Lester R. Smith, N. 6403 Perry, Spokane, Wash. 99207
Filed Aug. 31, 1966, Ser. No. 576,296
Int. Cl. F16l 55/12
U.S. Cl. 138—93                                      4 Claims

ABSTRACT OF THE DISCLOSURE

A temporary stopper for pipes and which has a relatively lightweight frame of cylindrical shape having closed ends and enclosed by means of a rubber-like envelope vulcanized to said ends; there being venting means from within the cylindrical frame to admit of inflation of the envelope, and a reinforcing rod centric of the frame tying the said ends together to counteract the expansion pressures thereon; and means for admitting and exhausting air from within the frame according to manual selection.

---

This invention relates broadly to the field of plumbing, and more particularly to an inflatable stopper for pipes wherein an inflatable element for stopping the flow of a fluid through a pipe or conduit is introduced temporarily into the pipe while in a deflated state and subsequently inflated to effect expansion of the resilient housing of the stopper into a condition wherein it firmly presses against the inner wall of the pipe to effectively seal with the same against the passage of a liquid or gas in the pipe, and when deflated may be readily removed by employing a pull rope attached at one end thereto and having its other end in a convenient and readily accessible location. Means are provided at a convenient location for manually controlling ingress and egresss of air under pressure with respect to a cavity of the stopper and determining momentarily the air pressure therein contained; which air pressure is proportional to the expansive force of the stopper housing engagement with the inner wall of the pipe.

It is one object of this invention to provide an inflatable pipe stopper which after insertion into a pipe may be conveniently and easily operated from a location remote from the pipe, over a desirable period of time and may be easily removed when its use is no longer required.

Another object of this invention lies in the provision of a fluid pressure expansible pipe stopper which is made from only a few inexpensive parts with a minimum amount of labor and therefore one that is relatively inexpensive to produce.

Still another object of this invention is to provide a pipe stopper which is very easily used by most unskilled laborers and is capable of withstanding severe handling.

Yet another object of this invention lies in the provision of a pipe stopper manufactured from a minimum number of inexpensive parts having substantially no requirements for precision fitting of the parts and thus one that is very inexpensively produced and yet very effective in its operation.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention, which is to be understood only in accordance with the appended claims. Furthermore, it should be understood that while the invention is described in one particular field of utility it is not my intention to so limit the applicability of the invention but I desire to reserve to myself the claimed invention for every use of which it is now known to be or subsequently discovered to be susceptible.

The preferred embodiment of the invention is disclosed in this specification and the related drawings consists in a hollow can-like frame enveloped in a resilient rubber envelope. The frame carries an anchor disposed externally of said envelope and to which a pull rope is secured for conveniently and easily removing the stopper from a remote location within a pipe. The frame also has a cavity into which air, from a remote source of air under pressure, is selectively introduced and exhausted through an air hose which includes a valve and a pressure indicating gauge.

Within my knowledge, the prior art reveals a number of fluid pressure inflatable stoppers, but their disclosures, both collectively and individually, fall short in that they neither disclose nor suggest a stopper which can be manufactured with a bare minimum of precision work using inexpensive materials and thus producing one of minimal cost of manufacture. The prior art also fails to disclose a stopper having means for securing a pull rope and thus one that is easily removed from remote locations in a pipe.

Specifically, my invention is an improvement over the patent to Hosking, numbered 2,843,154 and dated July 15, 1958, which shows a molded resilient body on machined end plates with threaded and tapped fittings and cross-bored holes. No pull rope or attachment for a pull rope is observable. Heretofore, stoppers have been removed by pulling upon the air hose which has shortened the life thereof by causing untimely ruptures and breaks at the juncture of the hose with its fittings. This practice has necessitated "beefing up" or strengthening of the valve stem or air tube connection at the stopper body thus increasing the overall cost.

Other advantages and features of this invention will become apparent from the more detailed description following in which like reference numerals are employed to designate similar parts in the accompanying drawings, wherein.

Figure 1:
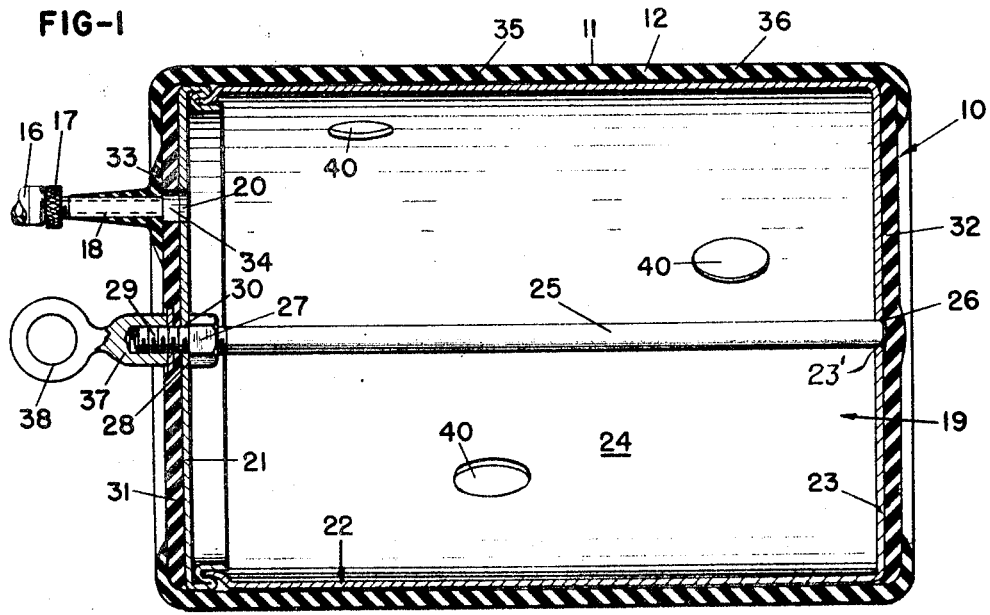
FIGURE 1 is a cross section through the axis of the pipe stopper.
Figure 3:
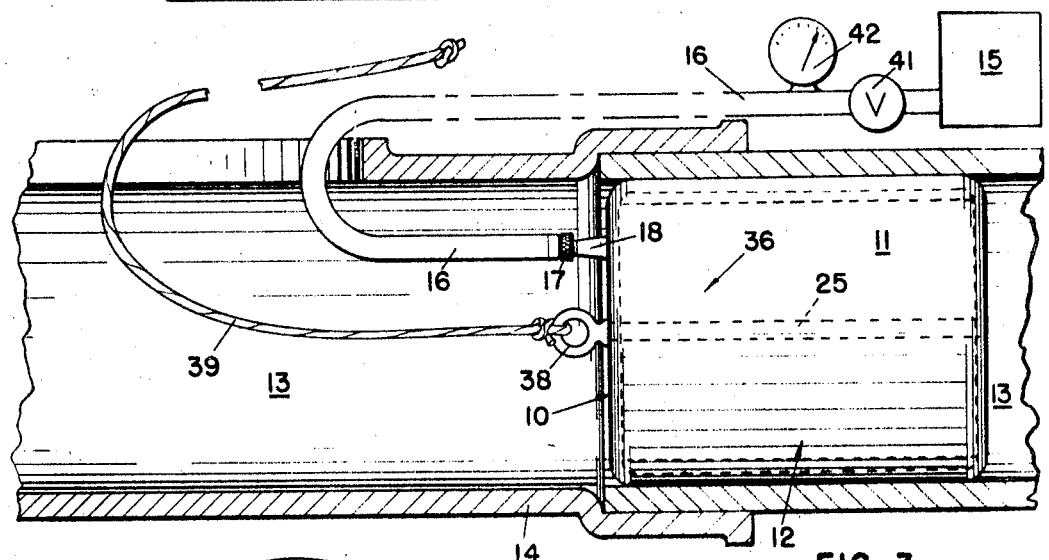
FIGURE 3 is an elevational view of the expanded stopper in a longitudinally sectioned pipe and sealing with the pipe wall.
Figure 2:
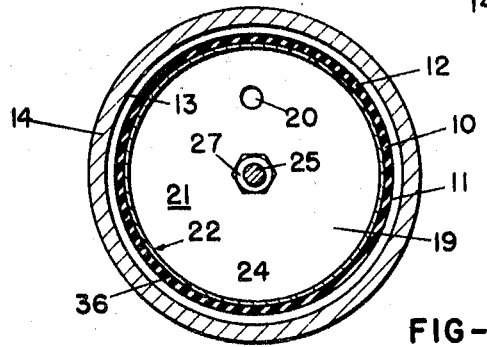
FIGURE 2 is a cross section taken laterally of the axis of the deflated stopper disposed within a pipe.

Referring now more particularly to the drawings, reference numeral 10 indicates in its entirety the stopper. While the dimensions of the stopper 10 are of minor import to an adequate understanding of the invention it may help to know that it is particularly useful in relationship to water pipes and waste or sewer pipes and in these relationships may be of a diameter selected from the range of 4 inches to 21 inches. It is my practice, in these usages to maintain the axial dimension at approximately 11 inches throughout this range of diameters, since this axial dimension has proven to dispose sufficient of the peripheral face 11 of the housing 12 in contact with the inner wall 13 of the subterranean pipe 14.

Obviously, the location of the pipe 14 is of no real significance and I therefore use the term "subterranean" to indicate a position which is difficult of access and removed from an area to which a compressor, storage tank or other source of air under pressure 15 may be readily transported and located.

An air hose 16, of any length required by the conditions then obtaining, is releasably connected by a conventional internally threaded, externally knurled hand nut 17 to the tube 18 which communicates with the cavity 19 interiorly of the stopper 10, through an aperture 20 formed in an end wall of a rigid frame 22 which includes an opposed spaced end wall 23 and a cylindrical wall 24. The said walls 21, 23 and 24 together constitute a rigid can-like frame 22 and are formed from light gauge sheet metal, say for example, and not limitation, 14 or 16 gauge. I have shown one end wall 21 as being removable; or more accurately, one that is adapted to be applied to the cylindrical wall 24 after the rod or tension member 25 is placed within the frame 22. The rod or tension member has one end secured to the end wall 23 as by welding externally of the frame at 26, the end of the rod passing through an aperture 23' formed centric of the end wall 23.

The opposed end 29 of the tie rod 25 is provided with standard threads which cooperate with a standard nut 27 forming a stop or shoulder 28 against which the end wall 21 is clamped and extends outwardly through an aperture 30 centric of the wall or cap 21 and beyond.

Raw sheet rubber, preferably of about 35 durometer in hardness, is applied at 31 and 32 over the end walls 21 and 23 with a rubber bonding agent disposed between the sheet rubber and the said end walls. Preferably the tube 18 is the type having an annular rubber flange 33 and is axially aligned with an aperture 34 formed in the sheet rubber 31 and communicating the tube 18 through the apertures 34 and 20 interiorly of the stopper with the cavity 19. A bonding agent (not shown) is employed between the flange 33 and the rubber 31 and in similar manner between the raw rubber and all faces or member to which it is desired that the rubber shall adhere by reason of the vulcanizing process employed during the manufacture of the stopper as hereinafter described.

Where it is desired that the rubber shall not adhere, but be free from the frame, a mold releasing agent (not shown) is applied. Particularly, said mold releasing agent is applied over substantially all of the outer peripheral face 35 of the cylindrical wall 24 and thus precludes vulcanization of the rubber thereto. The said bonding agent is applied over the annular marginal edge faces and edges of the sheet rubber at 31 and 32 and also along the peripheral margins of the cylindrical face 35 at its junctures with the end walls 21 and 23. Additional raw sheet rubber aforesaid is applied at 36 to form together with the portions at 31 and 32 a complete envelope of raw rubber around the frame 22 with only the end 29 of the rod 25 extending through the rubber envelope and the tube 18 disposed on the outer face thereof.

A washer is then disposed over the end 29 with a bonding agent between it and the rubber at 31 after which a nut 37 having an eye 38 is threaded on the end 29 and compresses the raw rubber against the wall 21 supported upon the shoulder 28.

Fabric, which is removed after the rubber is "cooked" or subjected to the vulcanizing process, is wrapped around the cylindrical portion 36 of the raw rubber and the unit is placed in a retort oven for about 1 hour at 275° Fahrenheit, under a pressure of 50 to 60 p.s.i. in the presence of adequate sulphur and in a well known manner to effect "curing" or vulcanizing of the rubber and attachment to the parts where a bonding agent was employed. Separation is provided where the mold release agent was applied, i.e. between the rubber 36 and the portion of the peripheral face 35 of the cylindrical wall 24.

I have termed this portion 36, of the envelope 31, 32 and 36, which is free from the wall 24, and therefore capable of distension by means of internal air pressure, "an external rubber housing," since this is the effective portion expansible into sealing engagement with a pipe wall 13 and also hermetically sealed with the frame 22. However, to insure the unit against accidental leakage of air from the cavity 19, and to strengthen the end walls 31 and 32, I prefer to provide a complete envelope 31, 32 and 36.

To freely admit passage of air between the cavity 19 and the exterior of the frame 22 to expand and contract the housing 36, I provide one or more apertures 40 which extend through the cylindrical wall 24.

When the pipe 14 is buried in the ground at a considerable depth, or the end through which the stopper is introduced into the pipe is in a pit where water or other debris may collect, or it has been necessary to position the stopper 10 deep within a pipe 14 by thrusting it axially therein, for example, with a long pole (not shown) or similar implement, it is readily removable after deflation of the stopper 10 by pulling upon the pull rope 39 secured in the eye 38 of the nut 37.

In the air hose 16 and adjacent to the source of air under pressure 15, and for controlling the ingress and egress of air with respect to the cavity 19, I provide a manually controllable valve 41. This valve is of the type which will direct the flow of air from the source 15 into the air hose 16, shut off the flow of air in the hose 16 in both directions simultaneously and exhaust the air from the hose while shuting off any flow from the source 15.

Intermediate the valve 41 and the stopper 10 I provide a pressure gauge 42 communicating with the air hose 16 and by means of which valve an gauge one can control the pressure within the cavity 19 to a predetermined quantity. Under normal conditions, in the uses aforesaid, 8 p.s.i. is sufficient to seal the housing against the pipe wall 13.

Selection of a stopper 10 having an outside diameter, when in the deflated condition of approximately one inch less than the inside diameter of the pipe wall 13 with which it is to be used has been found to be very effective and efficient.

While I have described one preferred physical embodiment of my invention employing specific materials, such as rubber, it should be understood that I do not intend to necessarily limit the scope of this disclosure thereto, but contemplate employing other natural and/or synthetic materials having the same or similar final characteristics; that is, expansible by means of internal air pressure and soft enough to seal with the inner face of a pipe to be plugged.

From the foregoing specification it will be readily apparent that the invention disclosed will adequately accomplish the functions for which it has been designed, in an economical manner, and that its simplicity and ease of operation are such as to provide an important advancement in the art to which it appertains.

Having thus described my invention, I desire to secure by Letters Patent of the United States, the following:

1. A pipe stopper, comprising:
   a rigid frame having a cylindrical wall and end walls closing the ends of said cylindrical wall and defining a cavity;
   said end walls having coaxial apertures therethrough;
   a tension member extending through said apertures and secured to said wall externally of said frame;
   said cylindrical wall having at least one aperture therethrough, whereby to facilitate passage of air;
   an external resilient housing circumscribing at least a portion of said cylindrical wall and hermetically sealed with respect to and in communication with said cavity;
   said housing being circumferentially free from at least a portion of said cylindrical wall; and
   means adapted for connection to an air hose and communicating through one said end wall with said cavity for admitting and exhausting air under pressure, whereby to selectively pressurize and this distend the free portion of said housing.

2. The invention in accordance with claim 1 and further characterized by:

said housing being an envelope enclosing said frame and vulcanized to said end walls.

3. The invention in accordance with claim 1 and further characterized by:

said frame being formed of relatively thin material;

said rod interconnecting said end walls being disposed on the axis of said frame;

an anchor secured to said rod and disposed externally of said envelope at the axis of said frame for securing a pull rope; and said housing being an envelope enclosing said frame and vulcanized to said end walls.

4. The invention according to claim 3 and further characterized by:

a pull rope secured to said anchor.

References Cited

UNITED STATES PATENTS

| 1,760,750 | 5/1930 | Goodman | 138—93 |
| 2,857,933 | 10/1958 | Lithun | 138—93 |
| 2,927,609 | 3/1960 | Vander Lans | 138—93 |

FOREIGN PATENTS

| 9,991 | 11/1902 | Austria. |
| 828,448 | 5/1938 | France. |
| 27,975 | 2/1903 | Switzerland. |

PATRICK D. LAWSON, Primary Examiner